United States Patent [19]
Thompson et al.

[11] Patent Number: 5,745,488
[45] Date of Patent: Apr. 28, 1998

[54] METHOD AND APPARATUS FOR DETECTION OF PACKET TYPES IN A COMMUNICATIONS NETWORK

[75] Inventors: Horace C. Thompson, Scottsdale, Ariz.; David C. Feldmeier, Morristown; William S. Marcus, Berkeley Heights, both of N.J.

[73] Assignee: Motorola, Inc., Schaumburg, Ill.

[21] Appl. No.: 639,603

[22] Filed: Apr. 29, 1996

[51] Int. Cl.$^6$ .................... H04L 12/50; H04L 12/56
[52] U.S. Cl. .................................................. 370/395
[58] Field of Search ........................ 370/395, 389, 370/392, 396–399, 400, 401, 408, 409, 351, 352, 355, 356, 432

[56] References Cited

U.S. PATENT DOCUMENTS

| | | | |
|---|---|---|---|
| 5,263,024 | 11/1993 | Kumaki et al. | 370/395 |
| 5,331,634 | 7/1994 | Fischer | 370/401 |
| 5,467,345 | 11/1995 | Cutler, Jr. et al. | 370/401 |
| 5,490,252 | 2/1996 | Macera et al. | 395/200.1 |

FOREIGN PATENT DOCUMENTS

| | | |
|---|---|---|
| 600683A | of 0000 | European Pat. Off. . |
| 19502414 | of 0000 | Germany . |
| 9411973 | of 0000 | WIPO . |
| 9508233 | of 0000 | WIPO . |

*Primary Examiner*—Douglas W. Olms
*Assistant Examiner*—Ajit Patel
*Attorney, Agent, or Firm*—James A. Coffing; Bradley J. Botsch, Sr.; John C. Scott

[57] ABSTRACT

Detection of the packet type of information packets received at a node in a packet based communications network is accomplished by comparing information from each received packet to a table (62) of possible packet types. After packet type has been identified, the corresponding packet is routed for processing based on type. For increased processing speed, the comparison with each of the entries in the table (62) can be performed substantially simultaneously. In one embodiment, a content addressable memory (CAM, 48) is utilized to store the table (62) information and to perform the required comparisons. In addition, wired OR means (50) is provided for use in reducing the total number of entries in the table (62). In a preferred embodiment, the cell types of asynchronous transfer mode (ATM) cells are detected.

26 Claims, 3 Drawing Sheets

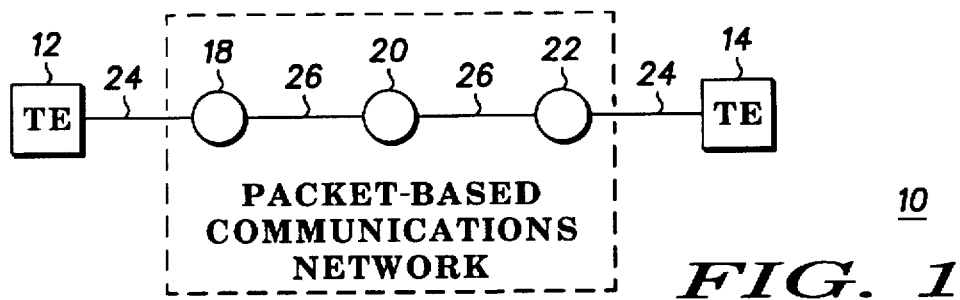
FIG. 1
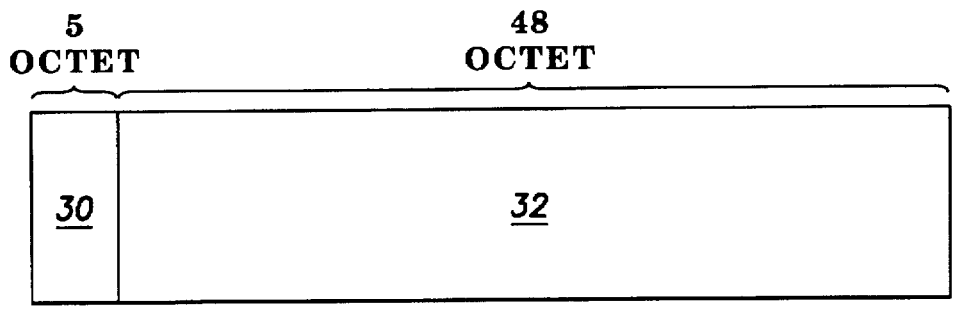
- PRIOR ART - FIG. 2
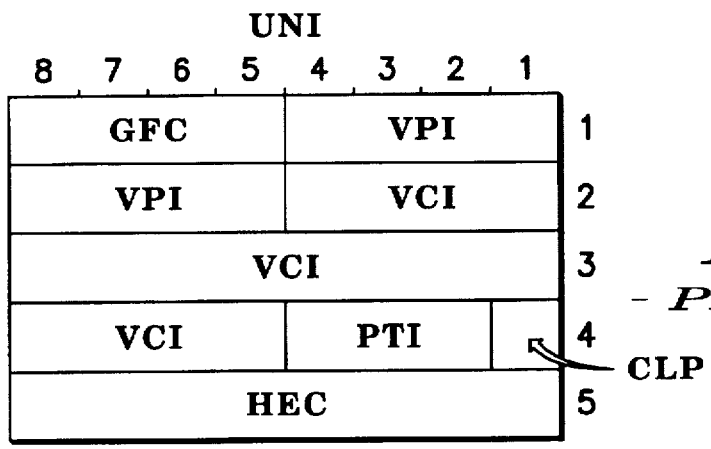
FIG. 3
- PRIOR ART -
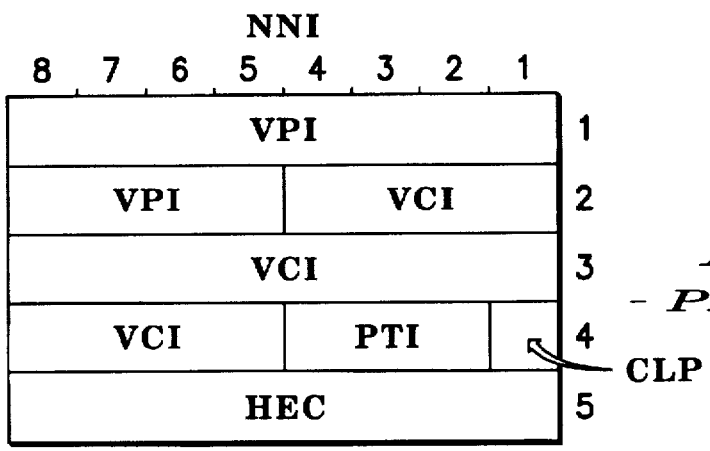
FIG. 4
- PRIOR ART -

| TERNARY CAM ARRAY 62 | | | | | | ADDRESS 72 | RAM ARRAY | | | | | |
|---|---|---|---|---|---|---|---|---|---|---|---|---|
| GFC[3:0] | VPI | VCI | PTI | DATA[383:376] | DATA[375:368] | | Ad | Route[2:0] | AAL[2:0] | UZUM[2:0] | NULL CELL | PRM[1:0] |
| (hex) | (hex) | (hex) | (bin) | (bin) | (bin) | (dec) | (bin) | (bin) | (bin) | (bin) | (bin) | (bin) |
| x | 00 | 0005 | xxx | xxxx xxxx | xxxx xxxx | 0 | 1 | 010 | 111 | 000 | 1 | 00 |
| x | 00 | 0005 | xxx | xxxx xxxx | xxxx xxxx | 1 | 1 | 001 | 111 | 000 | 1 | 00 |
| x | 00 | 0010 | xxx | xxxx xxxx | xxxx xxxx | 2 | 1 | 100 | 111 | 000 | 1 | 00 |
| x | 00 | 0010 | xxx | xxxx xxxx | xxxx xxxx | 3 | 1 | 001 | 111 | 000 | 1 | 00 |
| x | xx | 0003 | xxx | xxxx xxxx | xxxx xxxx | 4 | 1 | 001 | 111 | 000 | 1 | 00 |
| x | xx | 0004 | xxx | xxxx xxxx | xxxx xxxx | 5 | 1 | 001 | 111 | 000 | 1 | 00 |
| x | xx | xxxx | 100 | xxxx xxxx | xxxx xxxx | 6 | 0 | 000 | 111 | 000 | 1 | 00 |
| x | xx | xxxx | 101 | 0001 xxxx | xxxx xxxx | 7 | 0 | 000 | 111 | 111 | 1 | 00 |
| x | xx | xxxx | 0x1 | xxxx xxxx | xxxx xxxx | 8 | 0 | 000 | 000 | 000 | 0 | 01 |
| x | xx | xxxx | 0xx | x1xx xxxx | xxxx xxxx | 9 | 0 | 000 | 000 | 100 | 0 | 10 |
| x | xx | xxxx | 101 | 1111 0001 | 0000 xxxx | 10 | 0 | 000 | 111 | 100 | 0 | 00 |
| x | xx | xxxx | 101 | 1111 0010 | 0000 xxxx | 11 | 0 | 000 | 111 | 001 | 0 | 00 |
| x | xx | xxxx | 101 | 1111 0001 | xxxx xxxx | 12 | 0 | 000 | 111 | 010 | 0 | 00 |
| x | xx | xxxx | 101 | 1111 0010 | xxxx xxxx | 13 | 0 | 000 | 111 | 000 | 0 | 00 |
| x | 00 | 0055 | xxx | xxxx xxxx | xxxx xxxx | 14 | 1 | 001 | 101 | 000 | 0 | 00 |
| x | 00 | 0034 | xxx | xxxx xxxx | xxxx xxxx | 15 | 1 | 001 | 011 | 000 | 0 | 00 |
| x | 00 | 00xx | xxx | xxxx xxxx | xxxx xxxx | 16 | 1 | 001 | 000 | 000 | 0 | 00 |

FIG. 6

METHOD AND APPARATUS FOR DETECTION OF PACKET TYPES IN A COMMUNICATIONS NETWORK

FIELD OF THE INVENTION

The present invention relates generally to digital communications networks and, more particularly, to communications networks that transport information in packet form.

BACKGROUND OF THE INVENTION

In a packet based communications network, information is delivered between locations in the network in relatively small units, known as packets. The use of packets increases the efficiency of information transfer in the network by allowing signals from different sources to be multiplexed onto a common line, thereby better utilizing available bandwidths. The packets may be of variable length or of fixed length, depending on the communications protocol being implemented. For example, in an asynchronous transfer mode (ATM) system, each packet comprises a fixed length cell having a header portion and a payload portion. Conversely, in an Ethernet system, the packets comprise variable length frames having an address field, a variable length data field, and an error checking field.

Each packet in a packet based communications network may perform any one of a plurality of system dependent functions. For example, in an ATM system, individual packets may be used for the delivery of user data between nodes in the network, to perform signalling functions, or to perform operation, administration, and maintenance (OAM) tasks in the network. Data delivery in an ATM network requires segmentation of data files into small portions that can each fit into the payload section of a data cell. The small portions can then be reassembled after the data cells reach a destination node. Signaling refers to the process of setting up and disconnecting communications links within the network. Special signaling cells exist which facilitate these operations. OAM functions in the network may include performance monitoring, defect and failure detection, system protection, fault location inspection, and others. OAM cells may be periodically delivered to nodes in the network to ensure that the network is operating properly.

Because information packets perform many different functions in a communications system, a receiving node must be capable of detecting the packet type of each packet received from the network. By identifying packet type, the receiving node can direct each received packet to a specific location for processing in accordance with packet type. Proper packet type detection/ identification may also allow the network support elements to properly and accurately manage network resources and to accurately maintain an audit trail of network usage.

In addition to packet type identification, a receiving node must also be capable of rejecting invalid packets received by the node. Invalid packets may include, for example, packets mistakenly delivered to a node, packets properly delivered to the node but not authorized to use the node, or packets associated with an attempted incursion against the node.

In a packet based communications network, packets are normally delivered to a receiving node in a continuous stream over a channel having a predetermined bandwidth. To avoid a potential loss of data in the network, the receiving node must be capable of performing the above-described operations on the incoming stream of packets in substantially real time. Due to the ever increasing bandwidths of available communications channels, however, performance of the above-described operations in substantially real time has become increasingly difficult.

Therefore, a need exists for a method and apparatus for rapidly detecting the packet type of packets received by a node in a network. In addition, a need exists for a method and apparatus for rapidly rejecting invalid cells received at a node in a network.

BRIEF DESCRIPTION OF THE DRAWINGS

FIG. 1 is a block diagram illustrating a packet based communications system, which may utilize the present invention;

FIG. 2 is a diagram illustrating the structure of a conventional asynchronous transfer mode (ATM) cell;

FIG. 3 is a diagram illustrating the information structure of the header portion of a conventional ATM cell at a user network interface;

FIG. 4 is a diagram illustrating the information structure of the header portion of a conventional ATM cell at a network node interface;

FIG. 6 is a table illustrating the contents of a content addressable memory (CAM), in accordance with the present invention.

DETAILED DESCRIPTION OF A PREFERRED EMBODIMENT

Figure 5:
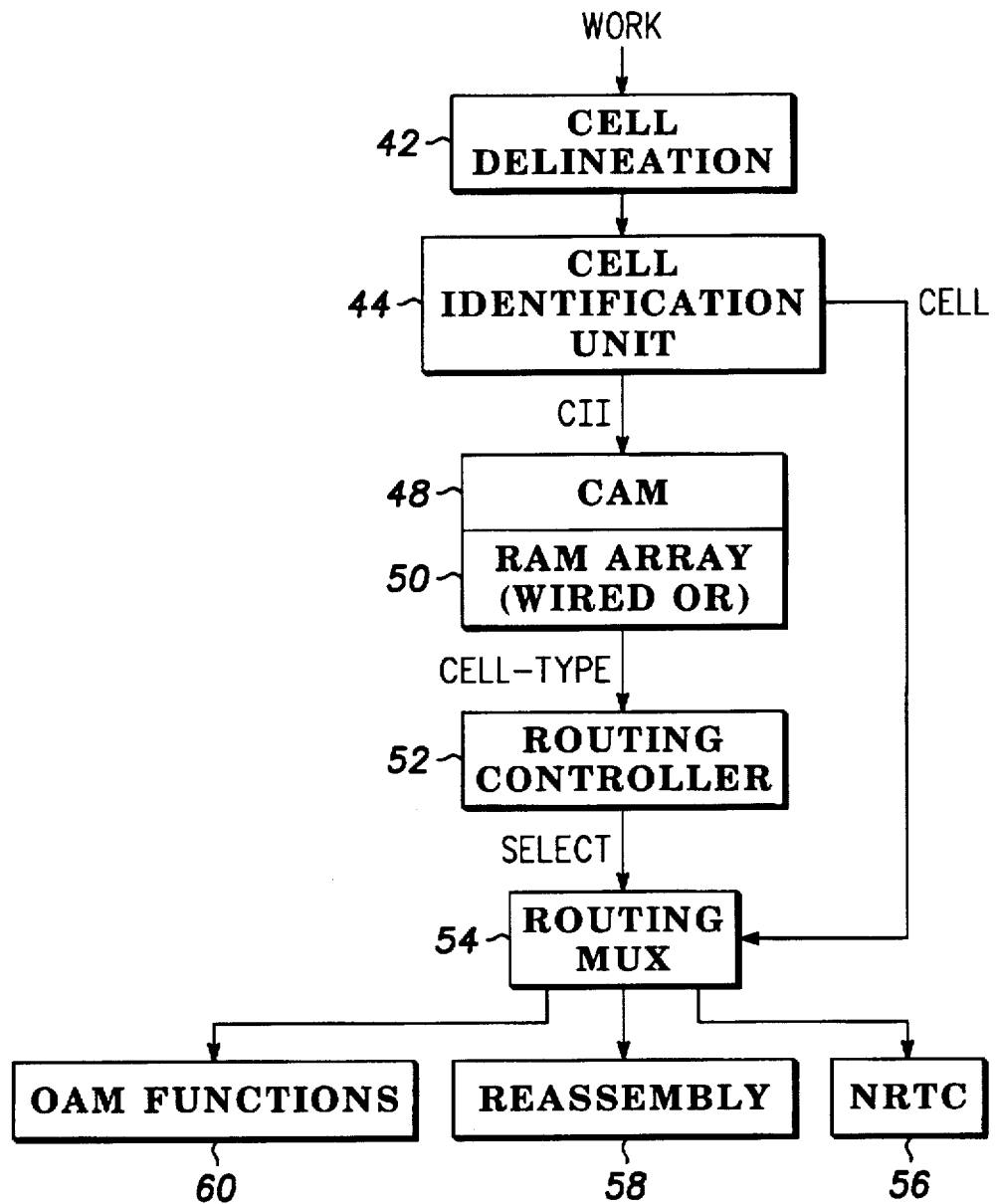
FIG. 5 is a block diagram illustrating a cell classification system, in accordance with the present invention.

The present invention relates to a method and apparatus for rapidly detecting the packet type of information packets received by a node in a network. The invention is also capable of rapidly rejecting invalid packets received by the node. The invention is capable of operating at very high bandwidths and can therefore service high speed communications links, such as those operating at OC-192 rates, substantially systolically. The invention uses a table for comparing information from each of the incoming packets to a list of table entries relating to possible packet types. The comparison with each of the entries in the list can be performed substantially simultaneously, which significantly increases the operational bandwidth of the apparatus. The invention has application in any digital communications system that transports information in packetized form, such as Ethernet systems, synchronous transfer mode (STM) systems, and, most preferably, asynchronous transfer mode (ATM) systems.

FIG. 1 is a block diagram illustrating a packet based communications system 10, which might utilize the method and/or apparatus of the present invention. As illustrated, the system 10 includes: first terminal equipment (TE) 12, second TE 14, and packet based communications network 16. The network 16 includes a plurality of switching nodes 18–22 for creating a virtual connection between the first TE 12 and the second TE 14 in response to a request from one of the TE's. Once a connection is made, the TE 12 can deliver and receive packets to/from the second TE 14 over the virtual connection, and vice versa. Each segment 24 connecting a TE to the network comprises a user network interface (UNI) which follows a protocol defining the interaction between the TE and a corresponding switching node. Similarly, each segment 26 connecting adjacent switching nodes in the network comprises a network node interface (NNI) which follows a protocol defining the interaction between the adjacent switching nodes.

The invention can be implemented anywhere in the system 10 where incoming packets need to be identified by packet type. For example, the invention can be implemented in one of the TE nodes 12, 14, a network gateway (not shown), a concentrator unit (not shown), the switching nodes 18–22, or in the front end of a cryptography unit (not shown) within the system. For purposes of convenience, however, the balance of the specification will describe the invention as implemented in a terminal equipment node.

In a preferred embodiment, the present invention is implemented in an asynchronous transfer mode (ATM) system. As described previously, ATM systems utilize fixed length information packets known as cells. As illustrated in FIG. 2, the conventional ATM cell is 53 octets in length and includes a 5-octet header portion 30 and a 48-octet payload portion 32. The type of information in the payload portion 32 of the cell depends on the cell type. For example, a data cell generally carries user data in its payload portion 32 for delivery between nodes in the network. The user data can correspond to any one of a number of services that are to be provided by the network. The payload portion 32 of the data cell can also include a field containing ATM adaptation layer (AAL) information for use in the reassembly of the user data once received by a receiving node. An OAM cell, on the other hand, generally includes fields for OAM cell type, OAM function type, information specific to the OAM type, and CRC information in its payload portion 32. Lastly, the payload portion 32 of a signalling cell generally includes a message field, a field identifying AAL parameters, a field identifying the address of the node attempting to establish a connection, a field identifying the address of the node to which a connection is being attempted, and a field identifying the quality of service requirements for the connection. It should be noted that a signalling message can be distributed across more than one cell.

FIGS. 3 and 4 illustrate the information structure of the header portion of a conventional ATM cell at the UNI 24 and NNI 26, respectively. The only difference between the two configurations is the inclusion of a 4-bit generic flow control (GFC) field in the UNI header, which does not exist in the NNI header. This GFC field is used to provide flow control information between the TE and the network for use in, among other things, the alleviation of short term congestion. The virtual path identifier (VPI) and virtual channel identifier (VCI) fields in the ATM cell header form the routing label of the cell. As illustrated in the figures, the VPI field occupies 8 bits in the UNI header and 12 bits in the NNI header, while the VCI field occupies 16 bits for both the UNI and the NNI headers. This routing label is used to route the cell through the network from the source TE to the destination TE and may be changed by the switching nodes en route based on the configuration of the connection. Upon arrival at the destination node, the VPI/VCI values in the cell header are unique to the particular connection and, therefore, uniquely identify a single transmission source. One exception to the above description of the VPI/VCI field is in a signalling cell where the VPI/VCI fields are preassigned values based on the type of signalling message being delivered.

The payload type identifier (PTI) field in the cell header identifies the type of information being carried by the payload portion of the cell. For example, the PTI field may indicate whether the cell is a user data cell or an OAM cell. In addition, the PTI field may also carry information as to traffic congestion in the network and the user-to-user status of the cell. The PTI field is 3 bits in length.

The cell loss priority (CLP) field is a one bit field that indicates the priority of a cell should a circumstance occur that requires the discarding of cells. If the CLP field contains a 1, the cell is deemed of lower priority and can be discarded before a cell having a CLP of 0. It should be noted that the CLP of a cell may be set by either the user or the network, based on the policy of the network administrator.

The header error control (HEC) field provides an 8 bit error correction/detection value based on the first four octets of the header. The HEC field allows the detection of multiple errors, as well as the correction of one error, in the header. The HEC field can also be used to perform cell delineation on an incoming bit stream.

FIG. 5 illustrates a cell classification system 40 in accordance with the present invention. As illustrated, the system 40 includes: a cell delineation unit (CDU) 42, a cell identification unit (CIU) 44, a content addressable memory (CAM) 48 having an associated RAM array 50, a cell type bus 46, a routing controller 52, a routing multiplexer 54, a non-real time controller (NRTC) 56, a data reassembly unit (DRU) 58, and an OAM processing unit (OPU) 60. The CDU 42 receives a data stream from the network 16 and determines the cell boundaries in the data stream. The CDU 42 then delivers each delineated cell to the CIU 44, which reads certain cell identification information (CII) from the cell and delivers the CII to the CAM unit 48. The CIU 44 also delivers the cell, or a portion of the cell, to the routing multiplexor 54. The CAM unit 48 simultaneously compares the CII of the cell to a plurality of table entries. If it is determined that the CII matches one or more of the entries in the CAM table, cell type information associated with the one or more CAM entries is output from the RAM array 50 onto a cell type bus 46. The cell type information is then delivered to the routing controller 52, which uses it to create a select signal for routing multiplexor 54. The routing multiplexor 54 uses the select signal to direct the cell delivered to it by the CIU 44 to an appropriate processing area based on cell type.

As described above, the CDU 42 is operative for receiving a data stream from the network 16 and determining the boundaries of the individual cells within the data stream. The CDU 42 can accomplish this, for example, by determining when an octet received by the unit matches the HEC value calculated for the previous four octets received by the unit 42. When it is determined that every fifty-third octet in the data stream produces a match, the CDU is said to be "synchronized" to the data stream and the boundaries of the cells are known.

The CIU 44 receives a delineated cell from the CDU 42 and reads the cell identification information (CII) from the cell. The CII comprises any information in the cell that can be used to categorize the cell by type. In general, this information can be garnered from the header portion 30 or the payload portion 32 of the cell. In a preferred embodiment, the CII includes four bytes from the header portion of the cell and two bytes from the payload portion of the cell.

As described above, the CIU 44 delivers each cell, or a portion thereof, to the routing multiplexor 54. Because of the fast operation of the CAM 48, the RAM array 50, and the routing controller 52, very little delay is experienced in the creation of the select signal and the cell is almost instantaneously multiplexed in the routing MUX 54. In an alternative embodiment, a buffer (not shown) can be used to hold the cell from the CIU 44 until the intervening circuitry has had a chance to create the select signal. The buffer can include any type of temporary digital storage device that is capable of moving stored data at the requisite speeds.

The CAM 48 is an associative memory device that is capable of searching a list of stored information entries based on the content of the entries, rather than the location of the entries in the memory. That is, the input to the CAM is an information string and the output of the CAM is the address of all of the memory locations in the CAM that contain the particular information string. This is in contrast to a conventional memory device having an address as an input and the information string contained at that address as an output. A unique property of CAM memories is their ability to search (i.e., compare to the information string) all of the entries in the CAM table simultaneously. This ability to perform simultaneous searching greatly increases the speed with which memory searches can be performed relative to conventional memories that require a sequential read and compare procedure. The simultaneous search capability is achieved, in part, by including a separate comparator means at each memory location in the CAM device.

In addition to simultaneous search capability, some CAM devices also include ternary search capability. A CAM device having ternary search capability allows a user to mask certain portions of the entries in the CAM table with so-called "don't care" bits so that comparisons with these bits will always create a match. For example, if the only relevant portion of an entry for comparison purposes is the first six bits, all of the other bits in the entry can be masked with "don't care" bits. When a data string is then compared to the masked entry, only the first six bits of the string will be compared to the corresponding bits in the entry and the other bits in the string will be assumed to match, regardless of their actual values. Therefore, if the first six bits of the data string match then the entire entry will be deemed a match.

The CAM 48 of cell classification system 40 comprises a table of entries relating to cell types that may be validly received from the corresponding network. The information fields in the CAM entries correspond to fields in the ATM cell and include the same fields used in the CII. For example, FIG. 6 illustrates the CAM table 62 used in the preferred embodiment of the present invention. The table 62 includes a plurality of entries 64, each of which is divided into six fields, namely: GFC, VPI, VCI, PTI, and two data fields. The plurality of entries 64 is also divided into separate sections corresponding to signaling cells 66, OAM cells 68, and data cells 70.

It should be appreciated that the number of entries in the data section 70 of the CAM table 62 of FIG. 6 (i.e., three) was made low for illustration purposes and in practice this number can be appreciably greater. The number of entries is based, in part, on the number of virtual channels that the network has enabled for communication with the corresponding node. In this regard, the number of entries in the CAM table 62 of any particular cell classification system will depend upon the location of the system in the network and will be appreciably greater when the system is buried within the network as compared with a system located on the edge of the network. The entries in the CAM table 62 are written by a network controller and may be periodically updated by the network controller as new channels are enabled and old channels are abandoned.

In a preferred embodiment, each entry in the CAM table 62 has an associated memory address 72 that is identified whenever an input data word (i.e., the CII) matches the corresponding entry. Also associated with each of the entries in the CAM table 62 is a data record in RAM array 50, which contains cell type information corresponding to the entry. Each data record is referred to as a code point and may include information relating to, for example, the processing and/or priority of a received cell. When a match between a CII word and an entry in the CAM table is detected, the code point associated with the entry is downloaded onto cell type bus 46 for delivery to the routing controller 52. This code point uniquely describes the type of cell that caused the match.

In a preferred embodiment, the cell classification system 40 makes use of the ternary search characteristics of the CAM 48 in performing the requisite comparisons. For example, signaling cells, as previously described, include preassigned VPI/VCI values that are unique as compared with the values contained in OAM cells, signalling cells or data cells for either data or signalling channels. Therefore, the CAM 48 need only compare the VPI/VCI fields of the entries in the signaling section 66 of the CAM table 62 to incoming CII words. All of the other fields in the signaling entries can thus be masked with "don't care" bits (indicated by x's in FIG. 6). Similarly, all irrelevant fields (or portions of fields) in the OAM section 68 and the data section 70 of the CAM table 62 can be masked. Masking can significantly reduce the overall number of entries required in the CAM table 62.

In general, the CAM table 62 includes at least one OAM entry and at least one data entry for every enabled VCI/IVPI channel. In accordance with a further aspect of the present invention, which is more fully described below, the number of OAM entries, and hence the total number of entries, in the CAM table 62 can be significantly reduced by making use of the redundancy of the VPI/VCI information in the table 62. By reducing the number of entries in the CAM table 62, smaller CAM devices may be used, thereby reducing implementation costs considerably. In the alternative, the reduction can allow a CAM of a predetermined size to service an increased number of enabled network channels.

In general, the cell type of an OAM cell can be fully described by certain information in its VPI, VCI, PTI, and data fields, as shown in FIG. 6. As described above, the entries in the data portion 70 of table 62 will include the VPI/VCI values for every valid connection to the node that is enabled by the network. Therefore, rather than having a separate OAM entry for every possible VPI/VCI value, the CAM 48 can use the VPI/VCI values from the data portion 70 in classifying OAM cells. This allows the VPI/VCI fields in the OAM portion 68 of the CAM table 62 to be masked, thereby greatly reducing the number of OAM entries in the table. To do this, the invention makes use of the multiple match capabilities of the CAM 48. For example, when an OAM cell is received by the system 40, the CAM 48 will compare the CII word from the cell with all of the entries in the CAM table. The CII will match one of the OAM entries (i.e., it will have the same PTI and data fields) and it will match one of the data entries (i.e., it will have the same VPI/VCI information). The RAM array 50 will then simultaneously output the code point corresponding to both the matched OAM entry and the matched data entry on the cell type bus 46. Because an open collector configuration is used, the signals from these two code points are, in a preferred embodiment, wire-ORed together on the bus 46, resulting in the proper cell type information for the received OAM cell. The wired-OR operation is effectively adding the required channel information to the other cell type information of the OAM cell. The wired-OR operation is substantially instantaneous and therefore adds relatively little processing delay to the system 40. If a data cell is received by the system 40, only one match will result in the CAM table 62 (based on the VPI/VCI information in the cell) and the appropriate code point will be downloaded onto the bus 46. Thus, no wired-OR operation will result.

The routing controller 52 receives the cell type information from the bus 46 and uses it to create a multiplexer select signal for the routing MUX 54. The cell type information generally describes how and where the received cell is to be processed. For example, if the cell is found to be a signaling cell, the select signal created by the routing controller 52 will cause the routing MUX 54 to deliver the cell to the non-real-time controller (NRTC) 56. The NRTC 56 then investigates the cell and makes a determination as to whether a requested connection should be made. If the received cell is an OAM cell, the routing MUX 54 will cause the cell to be delivered to an OAM unit 60 for appropriate processing. If the received cell is a data cell, the routing MUX 54 will cause the cell to be delivered to a reassembly area 58 based on the channel through which the cell was received. The routing MUX 54 is also capable of delivering received cells to a number of other locations within the system 40, in response to the select signal. In one embodiment, the routing controller 52 is dynamically programmable so that new cell types and new processing means can occasionally be added to the system 40.

When a cell is received by the system 40 that does not create a match with any of the entries in the CAM table, the cell is deemed an invalid cell. Invalid cells generally result from either a mistaken delivery to the node or from incursions against the node. A simple way of dealing with invalid cells is to merely discard them. However, if the security of the receiving node is of a high priority, the network controller might investigate the invalid cell while blocking its access to the node.

It should be appreciated that the terms "packet type" and "cell type", as used herein, can refer to any user defined method of distinguishing between packets or cells based on information within the cells. The method chosen by the user will generally depend on the processing requirements of the system. For example, in an ATM system, cell type may be detected by comparing only the PTI portion of each cell to a list. This would be the case if there was processing to be done that is channel independent (i.e., VPI/VCI doesn't matter).

What is claimed is:

1. In a packet based communications network that transports information packets between nodes in said network, a method for use in detecting packet type, comprising the steps of:
   receiving a first information packet including a first portion containing packet identification information, said first information packet identifying one of a plurality of packet types;
   providing a table that includes a plurality of entries, each entry corresponding to at least one of said plurality of packet types;
   comparing said first portion of said first information packet to entries in said plurality of entries, wherein at least two of said entries in said plurality of entries are substantially simultaneously compared to said first portion; and
   determining said packet type of said first information packet based on a result from said step of comparing.

2. The method of claim 1 wherein said step of receiving a first information packet comprises receiving an ATM cell having a header portion and a payload portion.

3. The method of claim 1 wherein said step of providing a table includes providing a content addressable memory (CAM).

4. The method of claim 1 wherein each of said packet types in said plurality of packet types defines at least a packet source and a packet information type.

5. The method of claim 1 wherein said step of determining includes performing a logical OR operation based on a result of said step of comparing.

6. The method of claim 1 wherein said step of comparing includes substantially simultaneously comparing all of said entries in said plurality of entries to said first portion.

7. The method of claim 1 wherein said step of providing a table includes masking a section of a selected entry in said table so that a comparison between said first portion of said first information packet and said selected entry will produce a match whenever an unmasked section of said selected entry matches a corresponding section of said first portion.

8. The method of claim 1 wherein said step of comparing results in a multiple match when said first portion of said first information packet matches multiple entries in said table.

9. The method of claim 8 wherein said step of determining comprises performing a logical OR operation using information associated with said multiple entries in said table.

10. In a packet based communications network that transports information packets between nodes in said network, a method for use in detecting packet type, comprising the steps of:
    receiving a first information packet including a first portion containing packet identification information, said first information packet identifying one of a plurality of packet types;
    providing a table that includes a plurality of entries, each entry corresponding to at least one of said plurality of packet types;
    comparing said first portion of said first information packet to entries in said plurality of entries to determine whether said first portion matches one or more of the entries in said plurality of entries; and
    when said first portion matches more than one of said entries in said plurality of entries, performing a logical OR operation on information associated with each of said more than one matched entries and outputting a result of said logical OR operation.

11. The method of claim 10, wherein said step of providing a table includes providing a content addressable memory (CAM).

12. The method of claim 11, wherein said step of comparing includes performing a CAM search wherein at least a portion of said entries in said CAM are concurrently searched.

13. The method of claim 10, wherein said step of performing a logical OR operation includes providing a wired OR means and connecting said wired OR means to receive said information associated with each of said more than one matched entries.

14. The method of claim 10, further comprising the step of:
    when said first portion matches only one of said entries in said plurality of entries, outputting information associated with said one matched entry.

15. The method of claim 10, wherein said step of performing further includes determining how to further process said first information packet based on said result of said logical OR operation.

16. The method of claim 10, wherein said first information packet comprises a fixed length cell having a header portion and a payload portion.

17. In a packet based communications network that transports information packets between nodes in said network, an apparatus for detecting a packet type of a packet in a data stream, comprising:

means for receiving said data stream;

means for identifying a first information packet in said data stream;

means for reading a first portion of said first information packet, said first portion including packet identification information;

means for comparing said first portion to a plurality of packet type identifiers resulting in a comparison output signal, wherein said means for comparing is capable of comparing said first portion to multiple packet type identifiers simultaneously; and means for determining said packet type of said first information packet using said comparison output signal.

18. The apparatus of claim 17 wherein said means for comparing includes means for masking a portion of selected packet type identifiers in said plurality of packet type identifiers before comparing said first portion to said selected packet type identifiers.

19. The apparatus of claim 18 wherein said means for masking includes means for indicating a "don't care" bit.

20. The apparatus of claim 17 wherein said means for comparing is capable of producing multiple matches between said first portion of said first information packet and said plurality of packet type identifiers.

21. The apparatus of claim 17 wherein said means for comparing is capable of substantially simultaneously comparing said first portion to all of said packet type identifiers in said plurality of packet type identifiers.

22. The apparatus of claim 17 wherein said comparison output signal indicates which of said packet type identifiers in said plurality of packet type identifiers matches said first portion.

23. The apparatus of claim 17 wherein said means for determining includes means for performing a logical OR operation.

24. The apparatus of claim 23 wherein said means for performing a logical OR operation includes wired OR means.

25. The apparatus of claim 23 wherein said means for performing a logical OR operation includes an open collector configuration.

26. In an asynchronous transfer mode (ATM) network that transports ATM cells between nodes in said network, an apparatus for detecting a cell type of a cell in a data stream, comprising:

a cell delineation unit that receives said data stream;

a cell identification unit, operably coupled to the cell delineation unit, such that a first information cell in said data stream is identified and a first portion of said first information cell is determined thereby, said first portion including cell identification information;

a storage device that includes a plurality of cell type identifiers;

a content addressable memory (CAM) device, operably coupled to the cell identification unit and the storage device to compare said first portion to the plurality of packet type identifiers, thereby resulting in a comparison output signal, wherein said CAM device is capable of substantially simultaneously comparing said first portion with multiple cell type identifiers; and a routing controller, operably coupled to receive the comparison output signal, which comparison output signal is used to determine said cell type of said first information cell.

* * * * *

UNITED STATES PATENT AND TRADEMARK OFFICE
CERTIFICATE OF CORRECTION

PATENT NO.: 5,745,488
DATE: April 28, 1998
INVENTOR(S): Thompson, et al.

It is certified that error appears in the above-identified patent and that said Letters Patent are hereby corrected as shown below:

Please correct the name of the Assignee on the patent. Add the following company to the list of Assignees: Bell Communications Research, Inc. Accordingly, the above identified patent consists of two assignees: Motorola, Inc. (as already identified on the face of the patent); and, Bell Communications Research Inc. (the entity to be added pursuant to this certificate of correction).

Signed and Sealed this

Twenty-fourth Day of April, 2001

*Attest:*

NICHOLAS P. GODICI

*Attesting Officer*      *Acting Director of the United States Patent and Trademark Office*